(12) United States Patent
Chung

(10) Patent No.: US 7,663,823 B2
(45) Date of Patent: Feb. 16, 2010

(54) VOICE COIL TYPE LENS DRIVE ASSEMBLY

(76) Inventor: Huang Tien Chung, 424-16, Chang Yun Road, Hwa-Tang Country, Chang-Twa (TW)

( * ) Notice: Subject to any disclaimer, the term of this patent is extended or adjusted under 35 U.S.C. 154(b) by 0 days.

(21) Appl. No.: 12/103,982

(22) Filed: Apr. 16, 2008

(65) Prior Publication Data
US 2008/0259468 A1    Oct. 23, 2008

(30) Foreign Application Priority Data
Apr. 19, 2007    (JP) .............................. 2007-110216

(51) Int. Cl.
*G02B 7/02*    (2006.01)
(52) U.S. Cl. ..................................... 359/824
(58) Field of Classification Search ................. 359/814, 359/823–824
See application file for complete search history.

(56) References Cited

U.S. PATENT DOCUMENTS 4,669,823 A * 6/1987 Iguma et al. ................. 359/824
7,391,579 B2 * 6/2008 Ho et al. ...................... 359/696

FOREIGN PATENT DOCUMENTS

JP        2005-128405        5/2005

* cited by examiner

*Primary Examiner*—Scott J Sugarman
*Assistant Examiner*—Vipin M Patel
(74) *Attorney, Agent, or Firm*—McGlew and Tuttle, P.C.

(57) ABSTRACT

A voice coil type lens drive assembly for adjusting the focus of a lens is provided which can prevent the occurrence of trouble in the event of exertion on an external force on the lens not only in a completed state of assembly but also during assembly or during disassembly for repair and is applicable also to a downsized lens drive assembly.

5 Claims, 12 Drawing Sheets (A)

(B)

(A)

(B)

VOICE COIL TYPE LENS DRIVE ASSEMBLY

BACKGROUND OF THE INVENTION

1. Field of the Invention

The present invention relates to a voice coil type lens drive assembly for adjusting the focus of a lens by utilizing a repulsive magnetic force which a magnetic field created upon energization of a coil induces between the coil and a fixed magnet opposed to the coil.

2. Description of the Related Art

Heretofore, in connection with a voice coil type lens drive assembly for adjusting the focus of a lens by utilizing a repulsive magnetic force which a magnetic field created upon energization of a coil induces between the coil and a fixed magnet opposed to the coil, it is a usually way of doing that the lens is kept standstill at an initial position thereof with a spring having weak force when the coil is not energized.

For example, in Patent Literature 1 (Japanese Patent Laid-Open Publication No. 2005-128405, see FIG. 2 and paragraphs 0025, 0029) there is disclosed a construction to prevent deviation and movement in a rotational direction of a lens support in a completed state of assembly.

According to this conventional construction, as shown partially in FIG. 15 and as described concretely in paragraph 0025 of Patent Literature 1, an engaging projection 133 formed on an inner periphery surface of a frame 123 comes into engagement with an engaging recess 135 formed in an outer periphery surface of a cap 124 to inhibit the rotation of a lens support 107 in the circumferential direction. Consequently, deviation and movement in a rotational direction of the lens support 107 are prevented.

In an assembling operation, as is described in paragraph 0029, an inner periphery surface 11a of a rear spring 111 is attached to the lens support 107, then a magnet 113 and a coil 115 fixed to the lens support 107 are disposed in the interior of a yoke 103, and mounted to a base portion 105b of a base 105 via a rear spacer 117. Thereafter, an inner periphery-side end portion 109a of a front spring 109 is placed between a front spacer 121 and the yoke 103 and is fixed with the cap 124. Further, the frame 123 is mounted to the base 105 and an outer periphery-side end portion 109b is fixed with the frame 123.

As is seen from the above description, deviation and movement in the rotational direction of the lens support 107 are prevented in only a state substantially close to a completely assembled state wherein the frame 123 and the cap 124 are coupled together.

However, in the construction disclosed in Patent Literature 1, it is desired to remedy the following inconvenience although there is no special defect in function.

Since deviation and movement in the rotational direction of the lens support 107 are prevented in only a state substantially close to a completely assembled state, such deviation and movement cannot be prevented during assembly or during disassembly for repair.

Therefore, in the event an external force should act on the lens support 107 in such a process, the front spring 109 or the rear spring 11, as a spring having weak force acting when the coil is not energized, will be damaged, which is not desirable. Moreover, in the case where a projection is formed in the outer periphery direction of the lens support 107, it ends up with an increase in size of the outline of the lens drive assembly.

BRIEF SUMMARY OF THE INVENTION

It is an object of the present invention to solve the above-mentioned problem and provide a voice coil type lens drive assembly for adjusting the focus of a lens, the lens drive assembly being capable of preventing the occurrence of a trouble in the event of exertion of an external force on the lens not only in a completed state of assembly but also during assembly or during disassembly for repair and being applicable also to a downsized lens drive assembly.

According to the present invention, for solving the above-mentioned problem, there is provided a voice coil type lens drive assembly for adjusting the focus of a lens by utilizing a repulsive magnetic force which a magnetic field created upon energization of coils of a movable unit loaded with the lens induces between the coils and fixed magnets opposed to the coils, the lens drive assembly comprising a base, an electrically conductive spring disposed on the base, a metallic yoke disposed on the electrically conductive spring, magnets mounted within the yoke, a movable unit inserted into the yoke in opposition to the magnets, a leaf spring disposed on the yoke, and a cover frame coupled to the base while being superimposed on the leaf spring, the movable unit comprising a coil base and coils, the coil base comprising a cylindrical body centrally formed with lens mounting threads and having a quadrangular outline, a plurality of projecting pieces erected on the cylindrical body at equal intervals while partially extending continuously with the lens mounting threads, and projections formed respectively on four outer faces of the cylindrical body, the coils being wound round the projections respectively, the base comprising a plate-shaped body formed of a synthetic resin by molding, four support rods projecting upward from four corners of the body, a lens aperture formed centrally of the body, a cylindrical guide erected along a peripheral edge of the lens aperture, and a groove formed outside the cylindrical guide, the projecting pieces of the movable unit being fitted in the groove formed on the base side to inhibit rotation of the movable unit.

Preferably, the base comprises a plate-shaped body formed of a synthetic resin by molding, four support rods projecting upward from four corners of the body, a lens aperture formed centrally of the body, a cylindrical guide erected along a peripheral edge of the lens aperture, a groove formed outside the cylindrical guide, projections formed on the inside base portions of the support rods, and recesses continuous on the upper side with the projections, the recesses biting into inner peripheries of the support rods and serving as mounting references.

Likewise, it is preferable for the coil base to comprise a cylindrical body having a quadrangular outline, a lens aperture formed centrally of the cylindrical body, lens mounting threads formed on the inner periphery of the lens aperture, two projections formed on each of outer periphery faces of the cylindrical body, and arcuate projecting pieces erected while partially extending continuously with the lens mounting threads.

According to the invention described in claim 1 there is provided a voice coil type lens drive assembly for adjusting the focus of a lens by utilizing a repulsive magnetic force which a magnetic field created upon energization of coils of a movable unit loaded with the lens induces between the coils and fixed magnets opposed to the coils, the lens drive assembly comprising a base, a pair of electrically conductive springs disposed on the base, a metallic yoke disposed on the electrically conductive springs, magnets mounted within the yoke, a movable unit inserted into the yoke in opposition to the magnets, a leaf spring disposed on the yoke, and a cover frame coupled to the base while being superimposed on the leaf spring, the movable unit comprising a coil base and coils, the coil base comprising a cylindrical body centrally formed with lens mounting threads and having a quadrangular outline, a plurality of projecting pieces erected on the cylindrical body at equal intervals while partially extending continuously with the lens mounting threads, and projections formed respectively on four outer corners of the cylindrical body, the coils being wound round the projections respectively, the base comprising a plate-shaped body formed of a synthetic resin by molding, four support rods projecting upward from four corners of the body, a lens aperture formed centrally of the body, a cylindrical guide erected along a peripheral edge of the lens aperture, and a groove formed outside the cylindrical guide, the projecting pieces of the movable unit being fitted in the groove formed on the base side to inhibit rotation of the movable unit. According to this construction, by maintaining a relative position of the coil of the movable unit with respect to the fixed magnets in a normal state to stabilize a relative position of the movable unit with respect to the whole of the lens drive assembly, it is possible to effect a lens focus adjustment in a satisfactory manner.

DETAILED DESCRIPTION OF THE INVENTION

Figure 1:
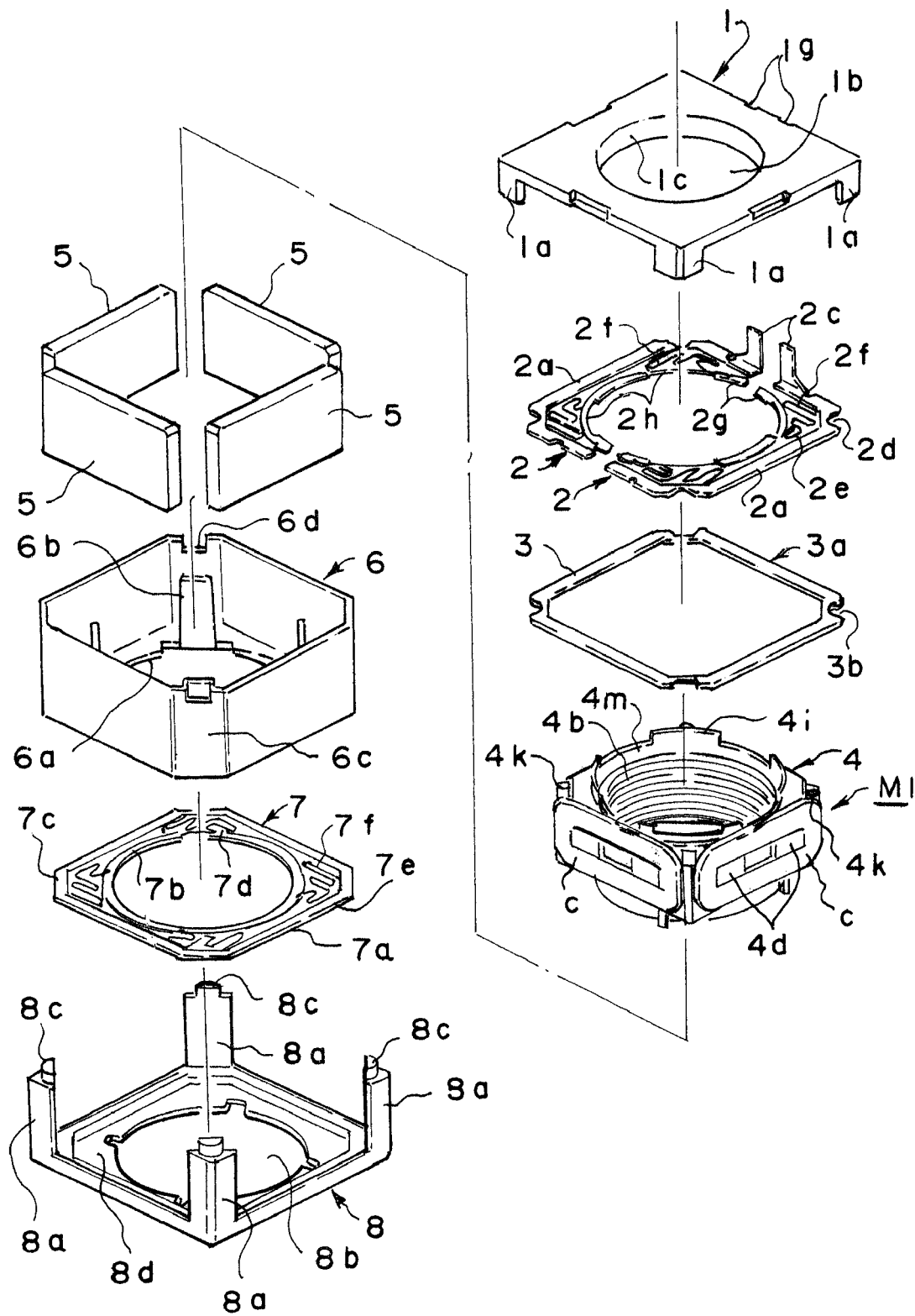
FIG. 1 is an exploded perspective view of a voice coil type lens drive assembly according to an embodiment of the present invention.

An embodiment of the present invention will now be described in detail with reference to the drawings. As shown in FIG. 1, a voice coil type lens drive assembly using a motor embodying the present invention is constituted by stacking within a cover frame 8 a leaf spring 7, a yoke 6, magnets 5, a coil base 4, a washer 3, electrically conductive springs 2 and a base 1 in this order. In the exploded perspective view for assembly of FIG. 1, as is seen from FIG. 2, the cover frame 8 to be positioned on an upper side is placed below and the components which should underlie the cover frame 8 are assembled successively upwards.

Figure 2:
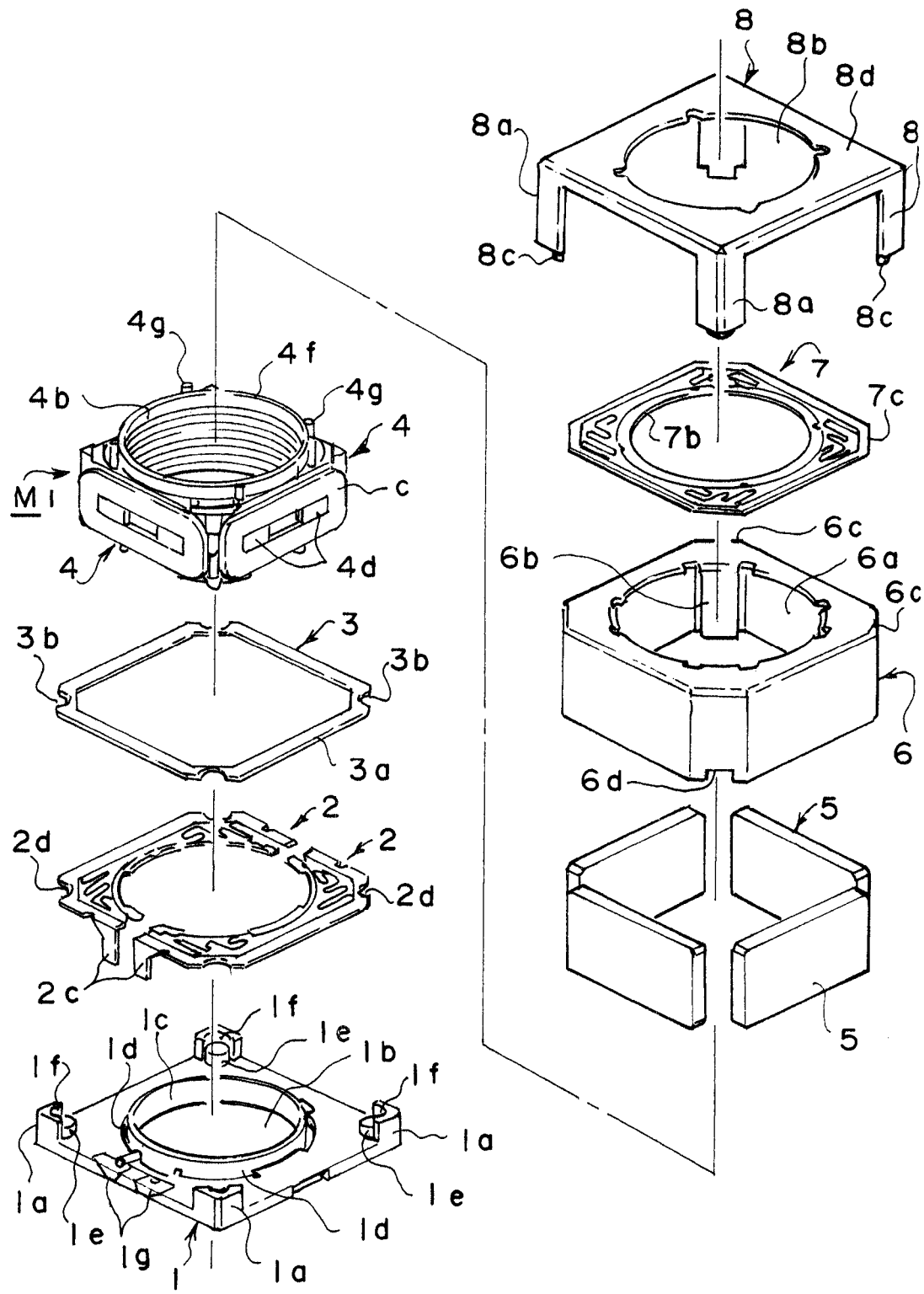
FIG. 2 is an exploded perspective view resulting from viewing the arrangement of FIG. 1 in the opposite direction.
Figure 3:
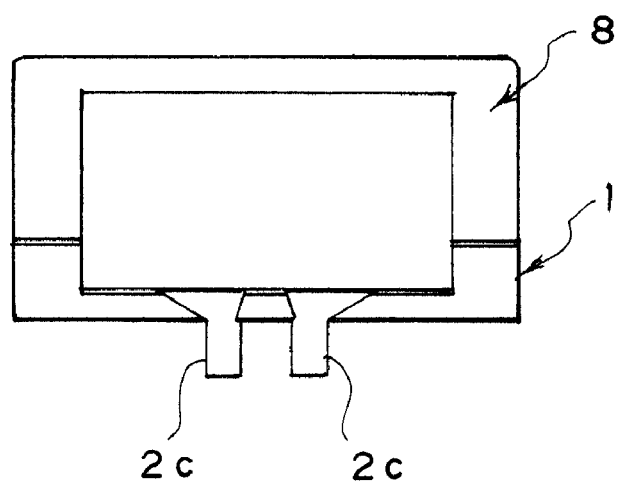
FIGS. 3(A), 3(B) and 3(C) are a plan view, a right side view and a rear view, respectively, of the voice coil type lens assembly of the embodiment.
Figure 3:
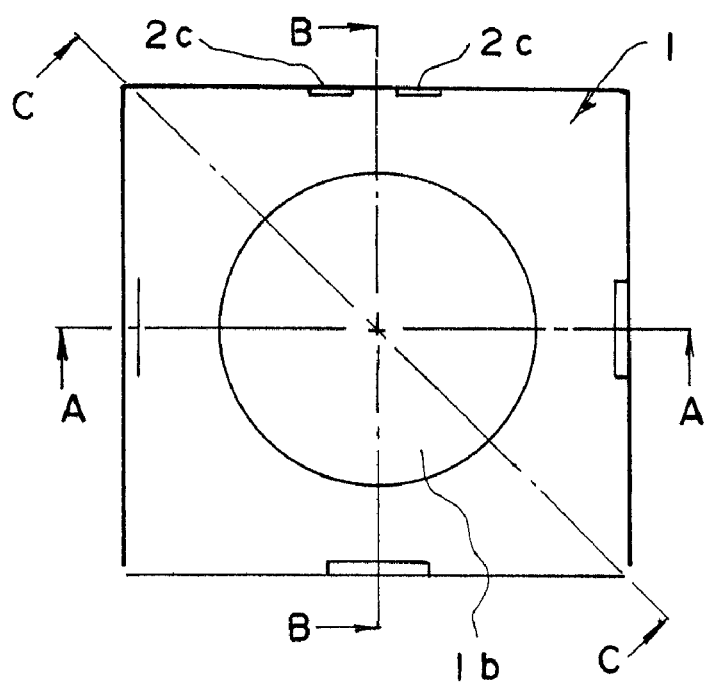
Figure 3:
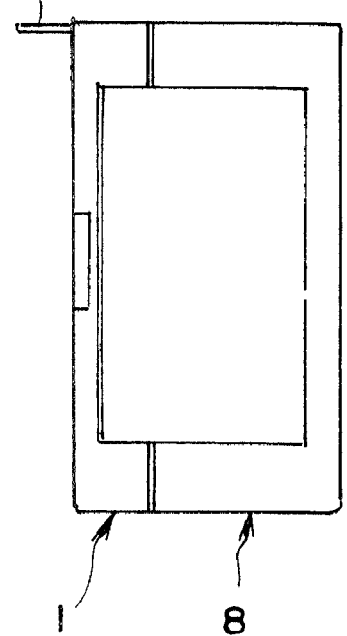

As shown in FIG. 2, the base 1 includes a body which is formed by molding in a quadrangular plate shape with use of a synthetic resin, and four support rods 1a projecting upwards are formed on the four corners of the body. A lens aperture 1b is formed centrally of the body and a cylindrical guide 1c is erected along a peripheral edge of the lens aperture.

Cutout portions 1g are formed in one side of the body.

Figure 8:
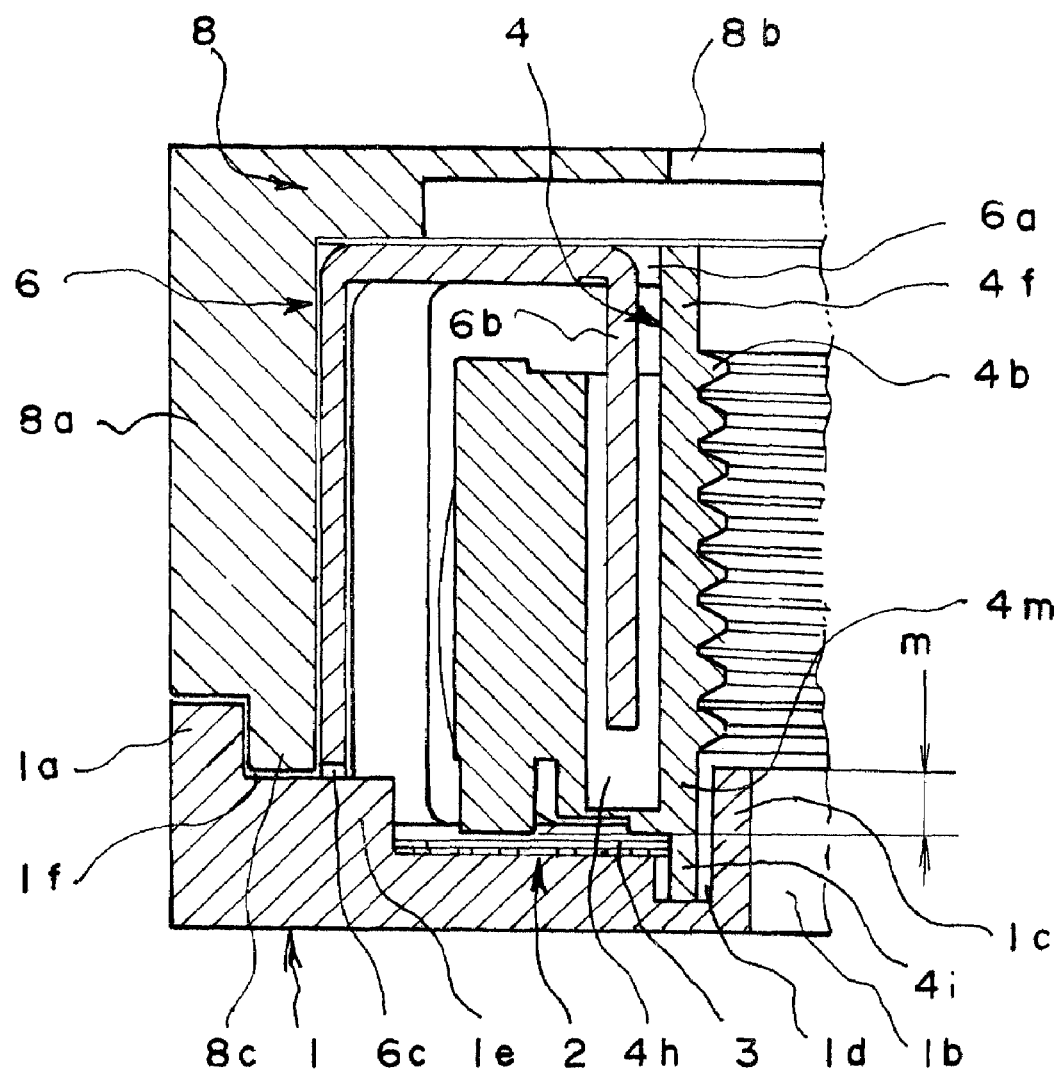
FIG. 8 is a partial enlarged sectional view of FIG. 6.
Figure 13:
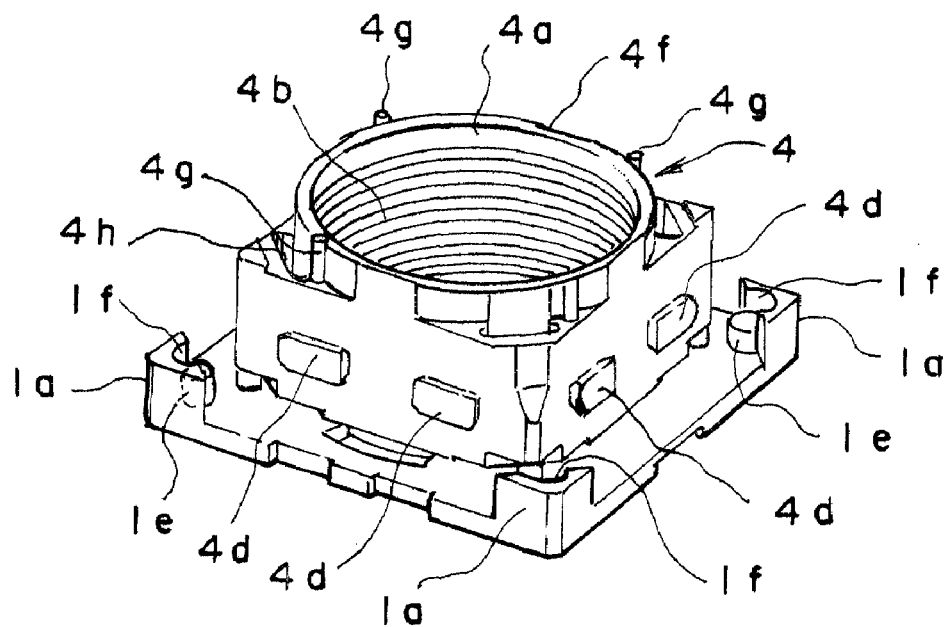
FIG. 13 is a perspective view showing an assembled state of the coil base to the base.
Figure 14:
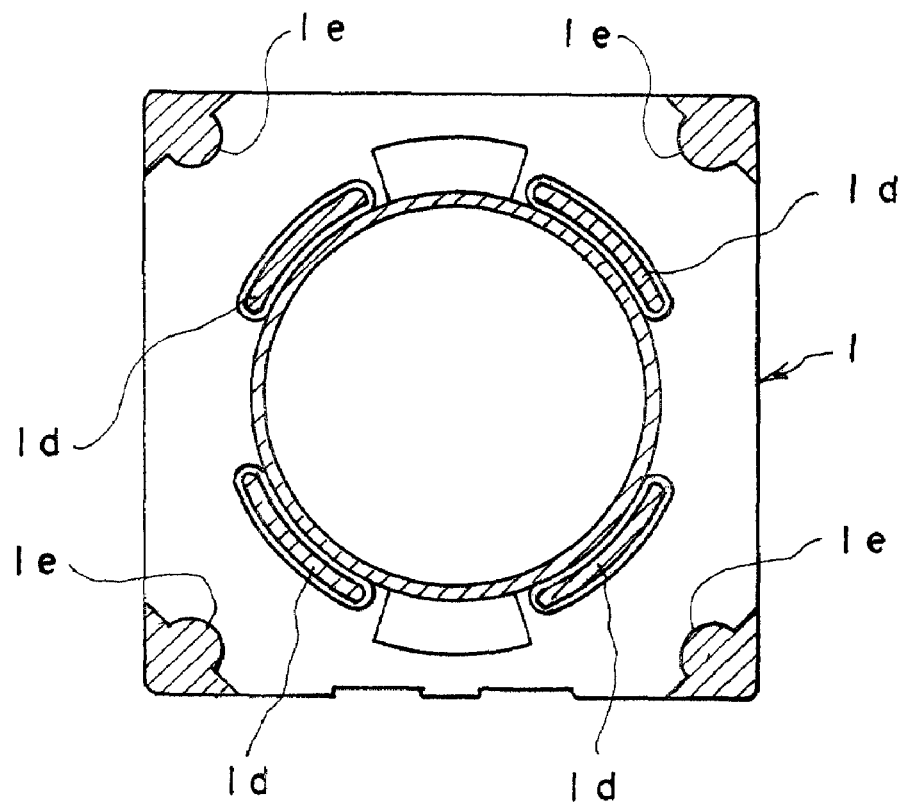
FIG. 14 is a plan view in cross section of the base.
Figure 15:
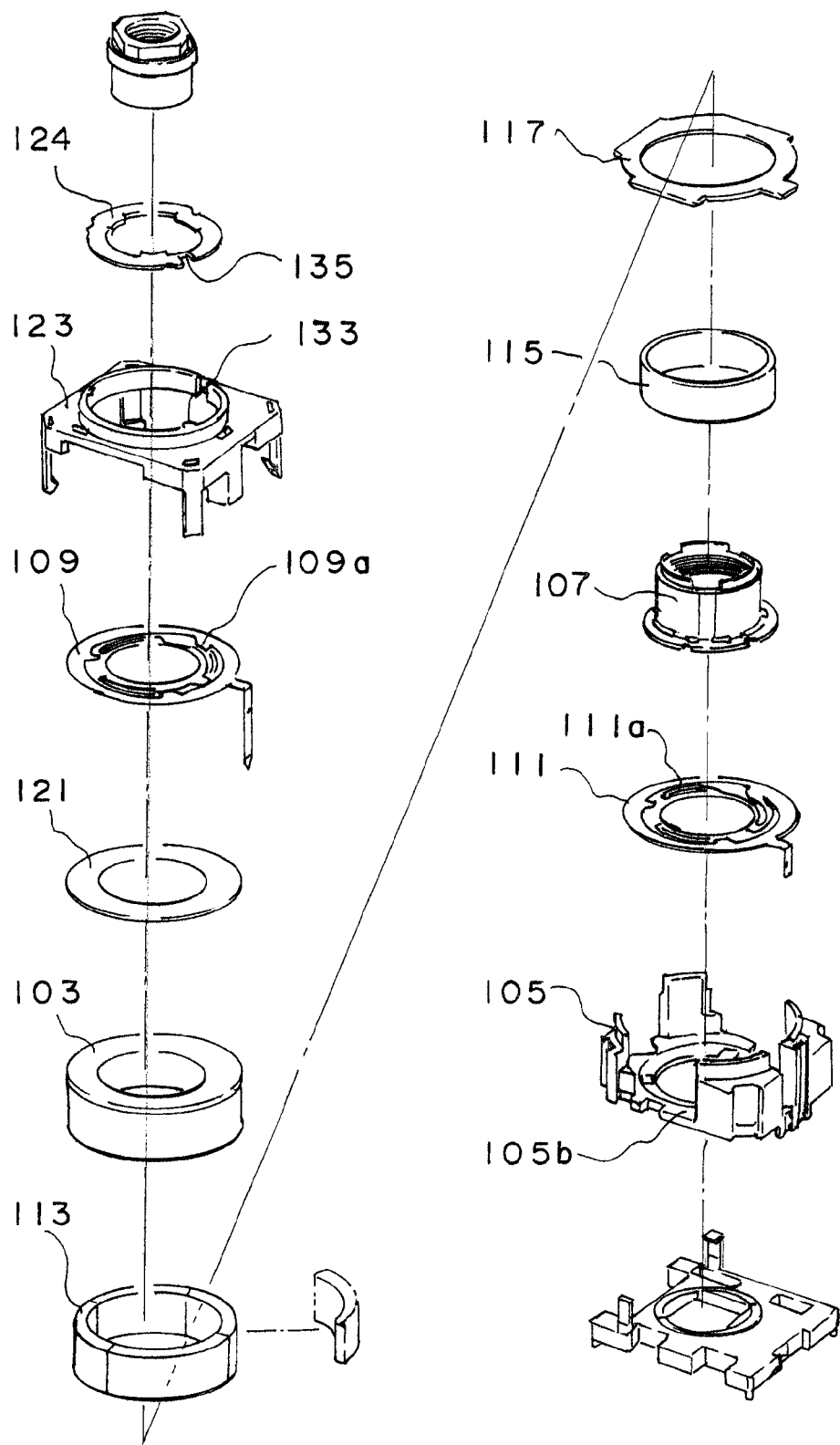
FIG. 15 is an exploded perspective view of a conventional voice coil type lens drive assembly.

As shown in FIGS. 8, 13 and 14, four arcuate and somewhat deep grooves 1d are formed at equal intervals outside a base portion of the cylindrical guide 1c. Further, semicircular projections 1e are formed on inside base portions of the support rods 1a and semicircular recesses 1f are formed continuously on the upper side with the projections 1e, the recesses 1f biting into inner peripheries of the support rods 1a.

Figure 11:
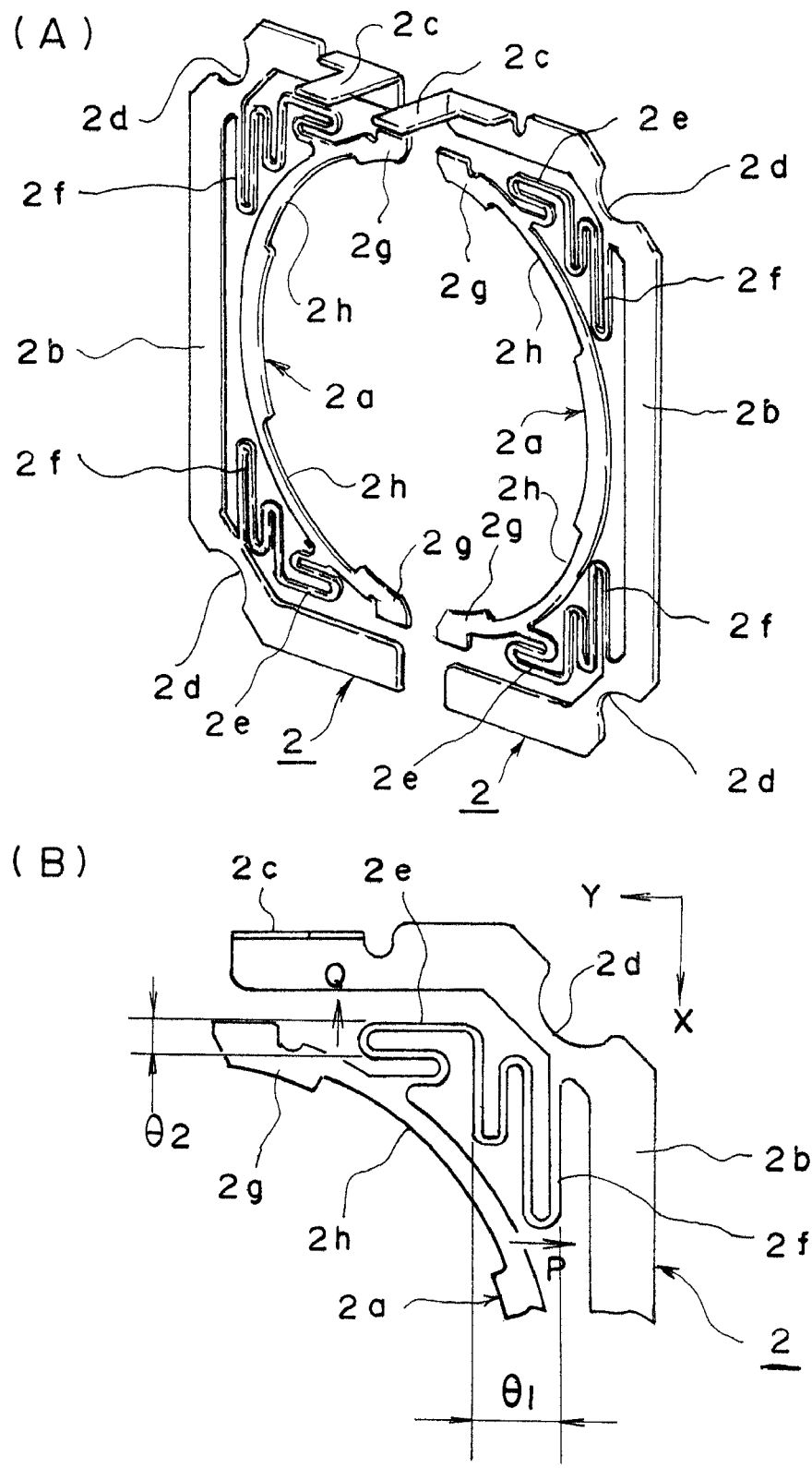
FIG. 11(A) is a perspective view of an electrically conductive spring and FIG. 11(B) is a partial enlarged perspective view thereof.

The electrically conductive springs 2 are each formed by a thin plate of a material having electrical conductivity and superior in resilience, e.g., phosphor bronze. As the electrically conductive springs 2 there are used a pair of leaf springs disposed symmetrically right and left and in opposition to each other. As shown in FIGS. 11(A) and 11(B), the electrically conductive springs 2 are each formed by an outer laterally-facing U-shaped spring body 2b and a semicircular thin spring piece 2a formed inside the spring body 2b. At one end of the outer spring body 2b is formed an L-bent support piece 2c and 45° chamfered and bent recesses 2d are formed in two outer corners of the spring body 2b.

The inner spring piece 2a and the outer spring body 2b are connected together through thin resilient wires. The resilient wires are each made up of a horizontal curvilinear portion 2e connected at one end thereof to the inner spring piece 2a and repeating U-turn and a vertical curvilinear portion 2f connected at an opposite end thereof to the outer spring body 2b and repeating U-turn. The curvilinear portion 2e connected at one end thereof to the inner spring piece 2a and repeating U-turn and the curvilinear portion 2f connected at the opposite end to the outer spring body and repeating U-turn cross each other at an angle of 90° for example. That is, with respect to one horizontal curvilinear portion 2e the other vertical curvilinear portion 2f is displaced 90° and is connected in this state to the curvilinear portion 2e.

Further, both end portions 2g of each of the inner semicircular spring pieces 2a are formed in a grooved hook shape for mounting thereto of terminals of coils C to be described later. Likewise, grooved guide portions 2h for mounting to the coil base 4 are formed in two upper and lower positions of the inner periphery of each spring piece 2a.

The washer 3 is constituted by a thin film formed of an electrically insulating material. As shown in FIGS. 1 and 2, the washer 3 is formed in the shape of a quadrangular frame 3a and small arcuate recesses 3b are formed in four outer corner portions of the frame 3a.

Although in this embodiment the electrically conductive springs 2 are formed in a bisected manner, they may be formed as an integral construction. In this case, one conductive terminal is drawn out from the leaf spring 7.

Figure 9:
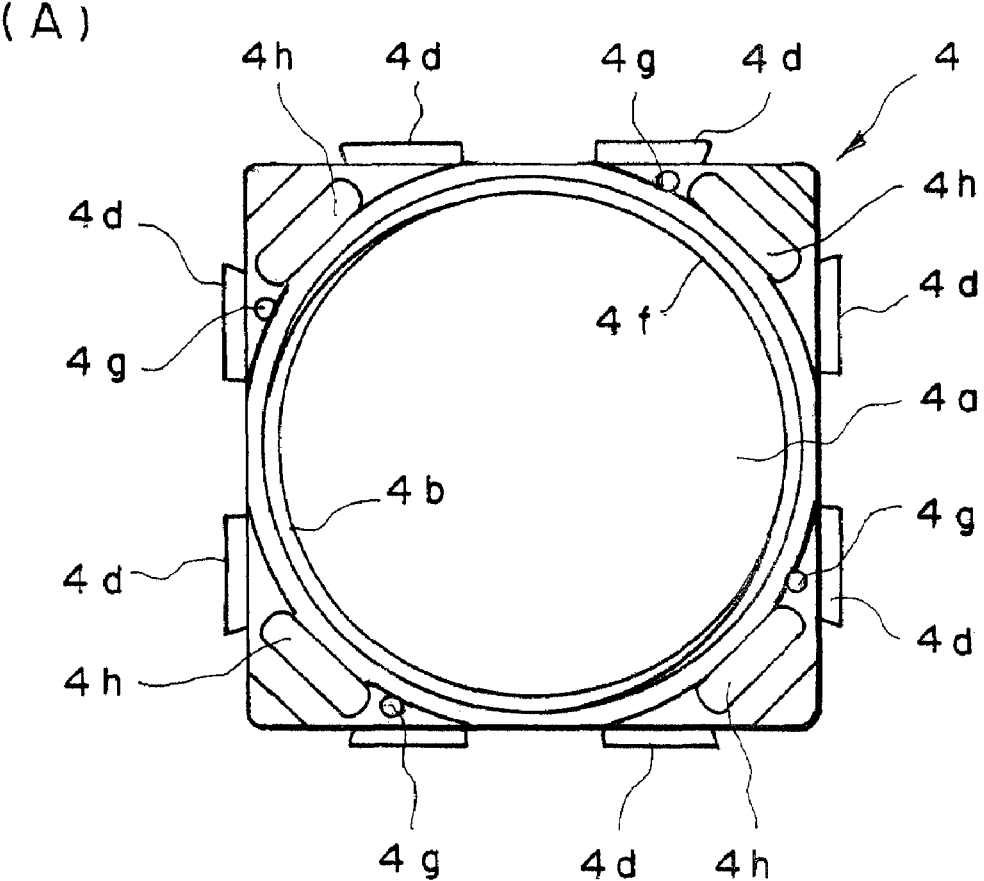
FIG. 9(A) is a plan view of a coil base and FIG. 9(B) is a right side view of the coil base.
Figure 9:
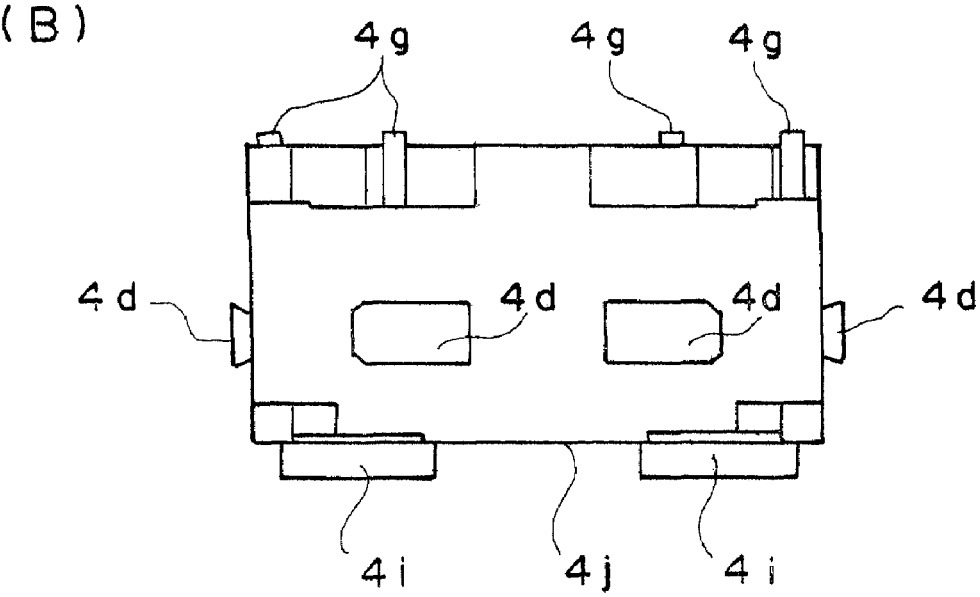
Figure 10:
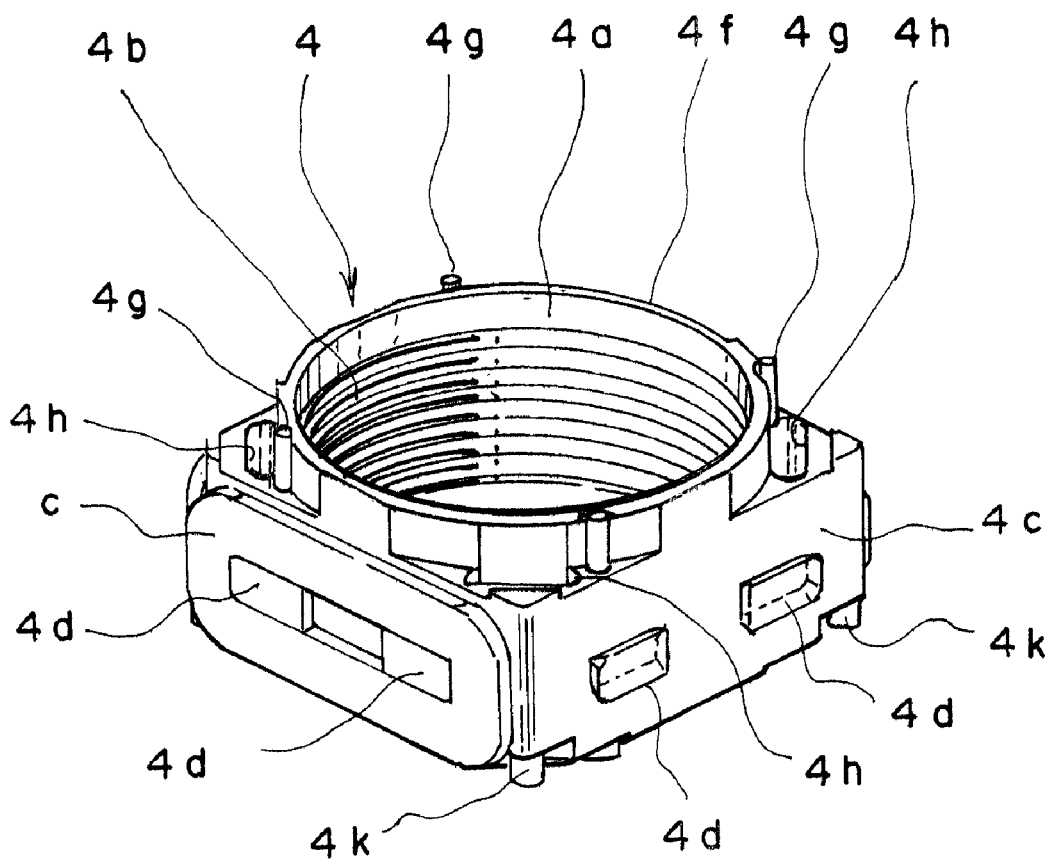
FIG. 10 is a perspective view of the coil base with some coils attached thereto.

As shown in FIGS. 9 and 10, the coil base 4 includes a cylindrical body having a quadrangular outline and a lens aperture 4a formed centrally of the cylindrical body. Lens mounting threads 4b are formed on the inner periphery of the lens aperture 4a. The whole of the coil base 4 is formed by molding with use of a synthetic resin. Two projections 4d are formed on each of outer faces 4c of the cylindrical body having a quadrangular outline. The projections 4d are each formed so as to be thin at a base portion thereof and thick on an outer side thereof. For example, an outer surface of each projection 4d is tapered with a rising gradient to enlarge the outside diameter.

Coils C are wound round the outer peripheries of the projections 4d in such a manner that each coil C is wound round two projections 4d formed on each outer face 4c of the cylindrical body.

In this case, when a predetermined number of turns have been wound in one place, the cylindrical body is rotated 90° and another coil C is wound on the next outer face 4c.

In this way coils are wound successively on the projections 4d formed on the four outer faces 4c and, in a mounting process to be described later, terminals of the coils are mounted for example by soldering to the end portions 2g of the inner spring pieces 2a of the electrically conductive springs 2.

The portion of the mounting threads 4b of the coil base 4 includes an upright cylinder 4f and four small cylinders 4g formed at equal intervals on the outer periphery of the cylinder 4f. Further, in the four corners of the cylindrical body of the coil base 4, deep, elongated, rectangular holes 4h are formed in parallel with an optical axis direction so as to contact the outer periphery side of the upright cylinder 4f.

Figure 12:
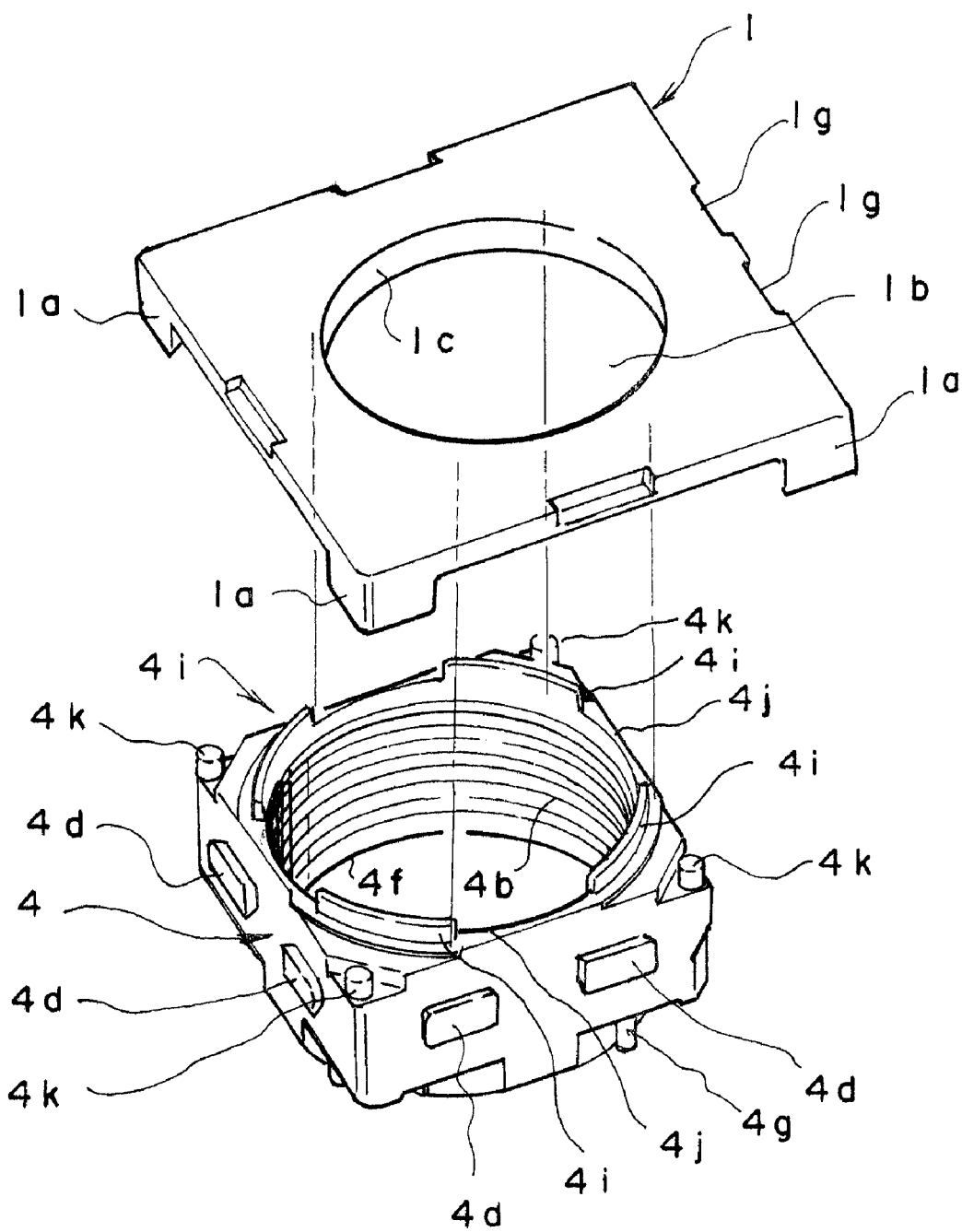
FIG. 12 is a perspective view showing a state of which a base and the coil base are about to be assembled together.

On the other hand, as shown in FIG. 12, on an upper surface of the cylindrical body on the side opposite to the aforesaid side in the optical axis direction of the coil base 4, in other words, on a lower surface side of the coil base 4 shown in FIG. 2, four arcuate upright projecting pieces 4i partially extending contiguously to the lens mounting threads 4b are formed at equal intervals. Flat faces 4j are formed outside the projecting pieces 4i. Small guide pins 4k are erected outside the flat faces 4i and on the four corners of the cylindrical body. Upon assembly, the arcuate projecting pieces 4i are fitted in the arcuate grooves 1d of the base 1.

Figure 4:
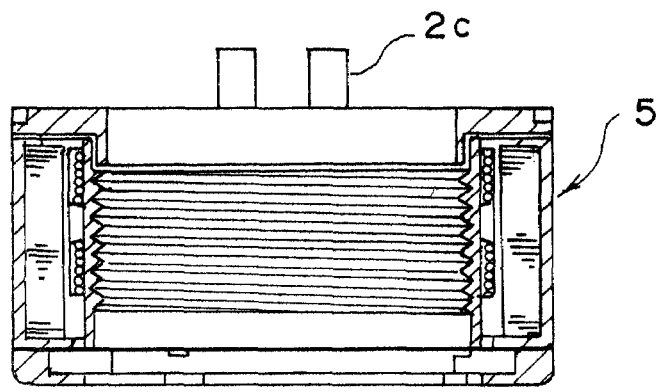
FIG. 4 is a plan view in cross section taken on line A-A in FIG. 3.
Figure 5:
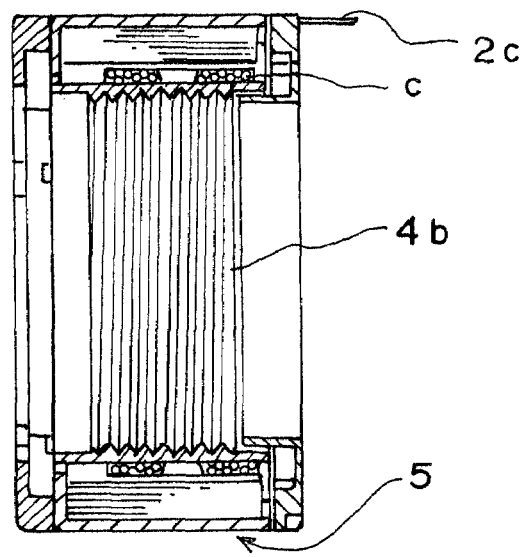
FIG. 5 is a side view in vertical section taken on line B-B in FIG. 3.
Figure 6:
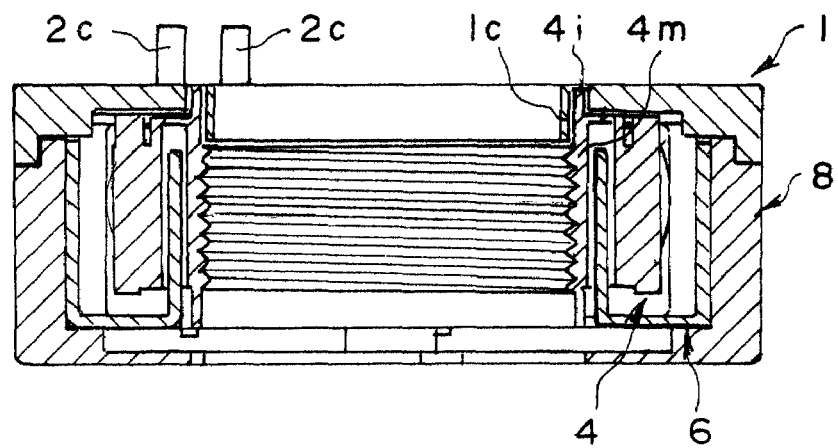
FIG. 6 is a sectional view taken on line C-C in FIG. 3.

The magnets 5, which are four magnets as shown in FIGS. 1 and 4, are magnetized as permanent magnets and are attached and fixed to four-side inner walls, respectively, of the yoke 6 to be described later formed by a thin metallic plate of a magnetic material.

As shown in FIGS. 1 and 2, the yoke 6 is made up of a bottomed quadrangular prism-like box having one lower surface (the lower surface in FIG. 2) and a bottom (the upper surface in FIG. 2) in the optical axis direction, the lower surface being open and a lens aperture 6a being formed centrally of the bottom, bent portions 6b bent straight downward from four corners of the bottom, and cut-in portions 6d formed in lower ends (upper ends in FIG. 1) of the four corners of the box on the side opposite to the bent portions 6b.

The fixed magnets 5 are attached to inside portions of the four sides of the box and the movable unit is disposed within the box in such a manner that the coils C are opposed to the magnets 5.

The corners of the box in the yoke 6 have faces 6c chamfered at an angle of 45° relative to the four side walls. Along the insides of the faces 6c the bent portions 6b are erected from the bottom. Likewise, square cut-in portions 6d are formed in the open-side ends of the faces 6c. The square cut-in portions 6d, which are formed precisely, are fitted on the semicircular projections 1e formed on the base 1 and serve as a mounting position reference for allowing the entire assembly to exhibit its performance.

Figure 7:
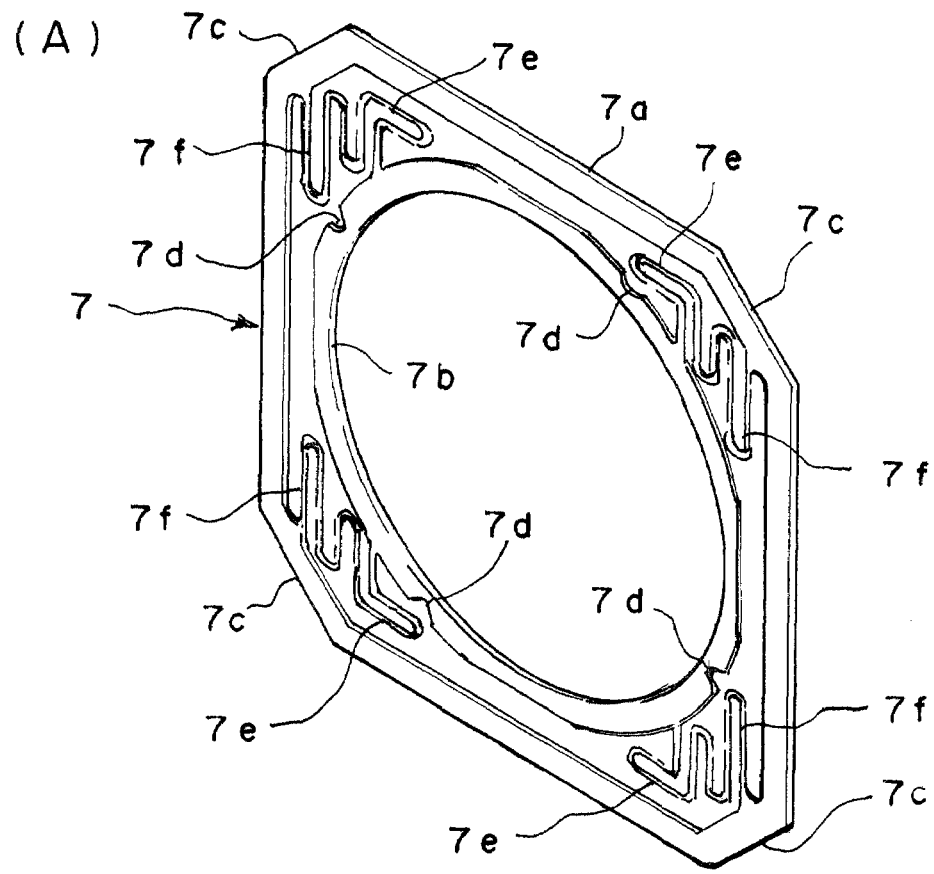
FIG. 7(A) is a perspective view of a spring and FIG. 7(B) is a partial enlarged perspective view of the spring.
Figure 7:
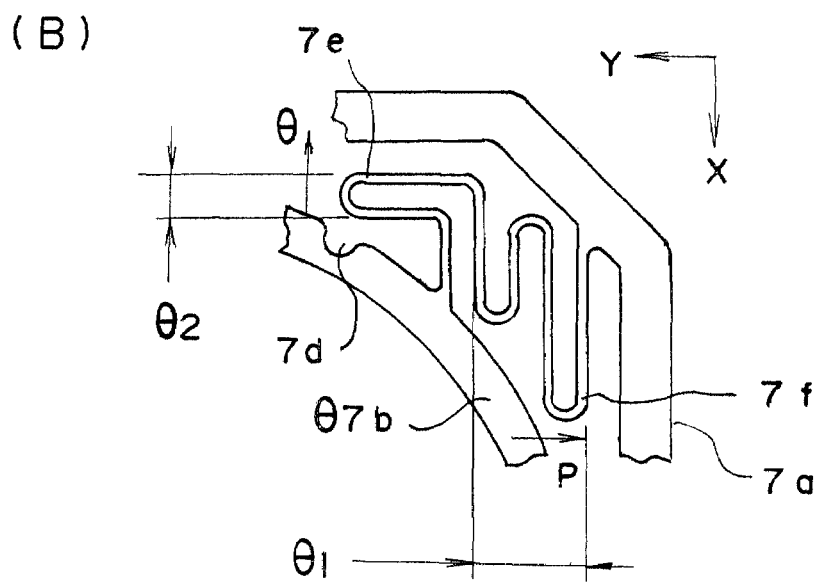

The leaf spring 7, like the electrically conductive springs 2, is formed by a thin plate of a material having electrical conductivity and superior in resilience, e.g., phosphor bronze. As shown in FIG. 7, the leaf spring 7 is formed by a single part and is made up of a thin spring frame 7a which is quadrangular on its outer edge side, a thin spring ring 7b which is circular on its inner edge side, and resilient wires for connection between the spring frame 7a and the spring ring 7b.

The four corners of the quadrangular outer spring frame 7a are formed by slant faces 7c which are chamfered at an angle of 45° so as to serve as a mounting guide and four semicircular recesses 7d also serving as a mounting guide are formed at equal intervals in the outer periphery of the inner spring ring 6b.

Like the electrically conductive springs 2, the aforesaid connecting wires are each made up of a horizontal curvilinear portion 7e connected at one end thereof to the inner spring ring 7b and repeating U-turn and a vertical curvilinear portion 6f connected at an opposite end thereof to the outer spring frame 7a and repeating U-turn. Also in this case as is the case with the electrically conductive springs 2, the curvilinear portions 6e and 6f are displaced at a crossing angle of 90°.

As shown in FIGS. 1 and 2, the cover frame 8 is made up of a plate-like body 8d formed in a quadrangular shape by molding with use of a synthetic resin, four support rods 8a erected downward in FIG. 2 on the four corners of the body 8d, and a lens aperture 8b formed centrally of the body 8d. The support rods 8a are each formed as a rectangular equilateral triangular prism having an internal angle of inclination of 45°. Semicircular projections 8c serving as connections are formed on lower ends (upper ends in FIG. 1) of the four support rods 8a.

A detailed description will now be given about in what order these components are assembled. Basically, as shown in FIG. 1, the leaf spring 7, yoke 6, magnets 5, coil base 4, washer 3, electrically conductive springs 2 and base 1 stacked in this order within the cover frame 8.

First, the spring 7 is mounted so that the slant faces 7c at the corners match respectively and contact the slant faces of the support rods 8a of the cover frame 8, then the yoke 6 is inserted within the cover frame 8 so that the lens aperture 6a faces down while matching the corner slant faces 6c with the slant faces of the support rods 8a. Thus, the leaf spring 7 is held in a sandwiched fashion in between the cover frame 8 and the yoke 6.

Next, the four magnets 5 are attached and fixed to the inner peripheries of the side walls of the yoke 6. In this case, since the magnets 5 are magnetized as permanent magnets and the yoke 6 is also formed of a magnetic material, it suffices to keep both stuck together.

Then, the movable unit M1 is inserted into the yoke 6. More specifically, the movable unit M1 is constituted beforehand by the coil base 4 and the coils C wound on the four outer periphery faces of the cylindrical body having a quadrangular outline of the coil base 4. The movable unit M1 thus constituted is inserted through the inside space of the magnets 5 into the yoke 6 and is mounted so that the four coils C are opposed to the fixed magnets 5 respectively. In this case, the rectangular holes 4h formed in the four corners of the coil base 4 are fitted on the inside bent portions 6b of the yoke 6. That is, the movable unit M1 is mounted with the inside bent portions 6b of the yoke 6 as guide and, in operation, it moves along the bent portions 6b.

By adopting such a mounting method, the movable unit M1 with coils C wound on the coil base 4 as above is relatively improved in dimensional accuracy as noted above, so that it is possible to ensure a stable distance between the coils C and the magnets 5 while maintaining a small gap between the two. Consequently, it is possible to develop a magnetic field by energization of the coils C and obtain a stable and strong repulsive force between the coils C and the magnets 5.

In this case, if the movable unit M1 is mounted with the bent portions 6b as guide, the cylindrical portion 4f formed on the lower side (the upper side in FIG. 2) of the coil base 4 comes to be fitted in the inside spring ring 6b of the leaf spring 7 in opposition to the same spring ring and at the same time the small cylinders 4g are fitted in the recesses 7d of the leaf spring 7.

Next, the washer 3 and the two electrically conductive springs 2 are put in this order onto the flat faces 4j of the coil base 4. The washer 3 is disposed in such a manner that the recesses 3b formed in the four corners become opposed to the insides of the support rods 8a of the cover frame 8. The two electrically conductive springs 2 are disposed in such a manner that the inside guide portions 2h are fitted on the four arcuate guide pins 4k of the coil base 4.

Then, the terminals of the coils C are soldered respectively to the inner end portions 2g of the two electrically conductive springs 2. The washer 3 is formed of an insulating material and thus electrical insulation is ensured lest the coils C and the electrically conductive springs 2 should come into accidental contact with each other and cause electric conduction. The above mounting process may be completed beforehand in the state of the movable unit M1.

Lastly, the base 1 is mounted, whereby the entire unit is completed. In this mounting process, the support rods 1a of the base 1 and the support rods 8a of the cover frame 8 are abutted against each other. Then, the semicircular projections 8c formed on the support rod tips of the cover frame 8 are fitted in the recesses 1f formed in the support rods 1a of the base 1.

At this time, the semicircular projections 1e formed inside the support rods 1a of the base 1 are fitted in the square cut-in portions 6d formed in the corner slant faces of the yoke 6 and are also fitted in the recesses 3b of the washer 3 and the recesses 2d of the electrically conductive springs 2. Further, the faces 6c chamfered in the corners of the yoke 6 are fitted inside the support rods 8a of the cover frame 8 and are thereby restricted positionally, thus effecting alignment with the base 1.

Therefore, the movable unit M1 is controlled to maintain its positional accuracy with respect to the cover frame 8 and the base 1 along the yoke 6 and it becomes possible to ensure a highly accurate and smooth operation of the same unit. That is, the semicircular projections 1e formed inside the support rods 1a of the base 1 are fitted in the square cut-in portions 6d formed in the corner slant faces of the yoke 6 and are also fitted inside the support rods 8a of the cover frame 8 and are thereby restricted positionally, thus effecting alignment with the base 1. When a check of the final assembled state is over, an adhesive is applied to the connection between the cover frame 8 and the base 1 or an adhesive tape is affixed to the outer periphery portion of the connection. Now, the coupling of the two is completed and hence the lens drive assembly is completed.

Thus, since the parts requiring positional accuracy are directly joined together and mounted, it is possible to diminish an allowance based on respective parts' errors, thereby maintain a relative position of the movable unit with respect to the whole of the lens drive assembly at the reference position and implement a highly accurate construction.

In such a coupled state, the L-shaped support pieces 2c of the electrically conductive springs 2 project from the cutout portions 1g of the base 1.

A detailed description will now be given about a method for operating the lens drive assembly of this embodiment constructed as above. An output signal from a lens control circuit (a known circuit, not shown) is inputted to the L-shaped support pieces 2c of the electrically conductive springs 2, whereby an electric current is supplied to the coils C and a magnetic field based on Fleming's left-hand rule is created in the coils C.

With the magnetic field thus created in the coils C, a repulsive force acts between the said magnetic field and the magnetic field of the magnets 5 which are attached to the yoke 6 in opposition to the coils C, so that the movable unit M1 moves by the distance corresponding to the output signal provided from the lens control circuit. In this way it is possible to effect a predetermined lens focus position control. That is, a subject image ray incident from the cover frame 8 side can properly form an image on a light receiving element disposed behind the base 1.

The present invention is not limited to the above embodiment, but changes may be made as necessary within the technical scope of the present invention.

What is claimed is:

1. A voice coil type lens drive assembly for adjusting the focus of a lens by utilizing a repulsive magnetic force which a magnetic field created upon energization of coils of a movable unit loaded with the lens induces between the coils and fixed magnets opposed to the coils, the lens drive assembly comprising:
    a base;
    an electrically conductive spring disposed on the base;
    a metallic yoke disposed on the electrically conductive spring;
    magnets mounted within the yoke;
    a movable unit inserted into the yoke in opposition to the magnets;
    a leaf spring disposed on the yoke; and
    a cover frame coupled to the base while being superimposed on the leaf spring,
    the movable unit comprising a coil base and coils, the coil base comprising a cylindrical body centrally formed with lens mounting threads and having a quadrangular outline, a plurality of projecting pieces erected on the cylindrical body at equal intervals while partially extending continuously with the lens mounting threads, and projections formed respectively on four outer faces of the cylindrical body, the coils being wound round the projections respectively,
    the base comprising a plate-shaped body formed of a synthetic resin by molding, four support rods projecting upward from four corners of the body, a lens aperture formed centrally of the body, a cylindrical guide erected along a peripheral edge of the lens aperture, grooves formed outside the cylindrical guide and projections formed on the inside base portions of the support rods, and recesses continuous on the upper side with the projections, the recesses biting into inner peripheries of the support rods and serving as mounting references
    the projecting pieces formed on the movable unit being fitted in the grooves formed on the base side to inhibit rotation of the movable unit upon assembly mounting of the lens thereto.

2. A voice coil type lens drive assembly according to claim 1, wherein:
    the projections include two projections formed on each of outer periphery faces of the cylindrical body; and
    the projecting pieces are arcuate projecting pieces extending continuously with the lens mounting threads.

3. A voice coil type lens drive assembly for adjusting the focus of a lens by utilizing a repulsive magnetic force which a magnetic field created upon energization of coils of a movable unit loaded with the lens induces between the coils and fixed magnets opposed to the coils, the lens drive assembly comprising:

a base;

an electrically conductive spring disposed on the base;

a metallic yoke disposed on the electrically conductive spring;

magnets mounted within the yoke;

a movable unit inserted into the yoke in opposition to the magnets;

a leaf spring disposed on the yoke; and a cover frame coupled to the base while being superimposed on the leaf spring, the movable unit comprising a coil base and coils, the coil base comprising a cylindrical body centrally formed with lens mounting threads and having a quadrangular outline, a plurality of projecting pieces integrally formed with the coil base with said projecting pieces extending from the cylindrical body at equal intervals while partially extending continuously with the lens mounting threads, and projections formed respectively on four outer faces of the cylindrical body, the coils being wound around the projections respectively, the base comprising a plate-shaped body formed of a synthetic resin by molding, four support rods projecting upward from four corners of the body, a lens aperture formed centrally of the body, a cylindrical guide erected along a peripheral edge of the lens aperture, and grooves formed outside the cylindrical guide, the projecting pieces formed on the movable unit being fitted in the grooves formed on the base side to inhibit rotation of the movable unit upon assembly mounting of the lens thereto.

4. A voice coil type lens drive assembly according to claim 3, wherein the base further comprises projections formed on the inside base portions of the support rods, and recesses continuous on the upper side with the projections, the recesses biting into inner peripheries of the support rods and serving as mounting references.

5. A voice coil type lens drive assembly according to claim 3, wherein:

the projections include two projections formed on each of outer periphery faces of the cylindrical body; and the projecting pieces are arcuate projecting pieces extending continuously with the lens mounting threads.

\* \* \* \* \*